(12) United States Patent
Takigawa

(10) Patent No.: US 6,841,745 B2
(45) Date of Patent: Jan. 11, 2005

(54) BATTERY DEVICE

(75) Inventor: Makito Takigawa, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/680,789

(22) Filed: Oct. 6, 2003

(65) Prior Publication Data
US 2004/0065536 A1 Apr. 8, 2004

(30) Foreign Application Priority Data

Oct. 8, 2002 (JP) .................................. 2002-294978

(51) Int. Cl.⁷ .............................................. H01H 35/42
(52) U.S. Cl. .................... 200/61.06; 200/5 A; 338/215; 337/15
(58) Field of Search .............................. 200/61.08, 5 A, 200/290, 402, 409; 338/215, 272; 337/15, 14, 125

(56) References Cited

U.S. PATENT DOCUMENTS

| 3,622,397 A | * | 11/1971 | Belove .......................... 429/55 |
| 4,822,959 A | * | 4/1989 | Schwab ........................ 200/5 A |
| 4,847,587 A | * | 7/1989 | Muller ........................ 338/215 |
| 5,766,790 A | | 6/1998 | Kameishi et al. |
| 5,766,793 A | | 6/1998 | Kameishi et al. |
| 5,898,356 A | * | 4/1999 | Gascoyne et al. ............ 337/15 |
| 6,045,939 A | | 4/2000 | Tateno et al. |
| 6,294,977 B1 | * | 9/2001 | Kalapodis et al. .......... 337/140 |

* cited by examiner

Primary Examiner—K. Lee
(74) Attorney, Agent, or Firm—Beyer, Weaver & Thomas LLP

(57) ABSTRACT

A battery device has a plurality of batteries connected in series. Each of the batteries includes a thermally responsive switch, a first conductive plate connected to a first terminal of the thermally responsive switch, a second conductive plate connected to a common terminal of the thermally responsive switch, and a third conductive plate which functions as a bypass when it is connected to a second terminal of the thermally responsive switch. In normal operation, the thermally responsive switch is in contact with the first fixed contact of the movable contact such that the first and second conductive plates are electrically connected. When the battery heats up abnormally, exceeding a maximum permissible temperature, the bimetal strip is inverted such that the movable contact comes into contact with the second fixed contact and thus the second and third conductive plates become electrically connected.

6 Claims, 4 Drawing Sheets

BATTERY DEVICE

BACKGROUND OF THE INVENTION

1. Field of the Invention

The present invention relates to a battery device including a plurality of batteries connected in series, such as a battery package, and more particularly to a battery device that remains operative even if the battery heats up abnormally.

2. Description of the Related Art

With battery devices including a plurality of batteries connected in series, a technique is known which provides a thermally responsive switch for safety purposes in the event of abnormal heating of the batteries. More specifically, continuing to supply electricity to an overheating battery increases the chance of leakage. Therefore, thermally responsive switches are provided between the batteries connected in series and if the temperature inside the battery package increases to the point at which it is detected as abnormal, the thermally responsive switch is turned off to interrupt the supply of electricity to all the batteries.

The thermally responsive switch includes a thermally responsive element such as a bimetal strip which is composed of a plurality of laminated metal plates having different thermal expansion coefficients. This bimetal strip is fixed to a housing at one end thereof while the other end is free to move. The free end of the bimetal strip is provided with a movable contact which faces a fixed contact provided on the housing and can be in contact with the fixed contact. Below a predetermined temperature, the movable contact is in contact with the fixed contact, that is, the thermally responsive switch is on. If the temperature exceeds the predetermined temperature, the bimetal strip is inverted and the movable contact is detached from the fixed contact, thereby turning off the thermally responsive switch. Therefore, this type of thermally responsive switch is preferable for a thermal protector for detecting abnormal heating and eliminates or suppresses abnormal heating.

With such known battery devices described above, if the thermally responsive switch detects abnormal temperature elevation in one battery, the electricity supply to all the batteries is discontinued, thereby halting the power-supply function. More specifically, even though only one battery malfunctions and the other batteries operate normally, electrical equipment using the battery device as a power supply no longer functions. In this respect, this type of battery device is not efficient. Furthermore, even after electricity supply to the defective battery is interrupted, the temperature of the battery device does not immediately fall. Thus, a cooling fan or an alarm may be actuated for safety purposes, but with those known battery devices, the thermally responsive switch is not connected to an external circuit such as a protection circuit to output instruction signals. Hence, a safety mechanism for the abnormal heating of batteries could be complicated.

SUMMARY OF THE INVENTION

To solve the aforementioned problem in association with the known battery devices, it is an object of the present invention to provide a battery device that remains operative even if some batteries heat up abnormally, and offers improved safety.

To achieve the aforementioned object, with the battery device of the present invention, a plurality of batteries connected in series each include a bypass functioning as a conductive path such that electricity flows around the battery and a switch for interrupting the flow of electricity into the battery above a maximum permissible temperature, and causing the electricity to flow through the bypass.

According to the battery device of the present invention, when any of the batteries heats up abnormally, the switch interrupts the flow of electricity into the defective battery and permits electricity to flow through the bypass. Therefore, electricity goes around the defective battery and flows though the bypass into the adjacent battery. That is, by connecting a bypass of a battery to a switch of the adjacent battery, even if a battery heats up abnormally, electricity flows through the bypass going around the defective battery and thus the battery device keeps supplying electricity. Furthermore, the bypass may be connected to an external circuit such as a protection circuit. Therefore, the abnormal heating of a battery may be reported, i.e., outputted and a cooling fan or an alarm may be actuated, thereby providing improved safety.

With the battery device of the present invention, preferably the switch includes a first fixed contact connected to each of the batteries, a second fixed contact connected to the bypass, a thermally responsive element which is composed of a plurality of laminated metal plates having different thermal expansion coefficients and which shifts between the first fixed contact and the second fixed contact, and a movable contact which is provided at a free end of the thermally responsive element and is in contact with either the first fixed contact or the second fixed contact. Preferably, below the maximum permissible temperature, the movable contact is in contact with the first fixed contact, and above the maximum permissible temperature, the thermally responsive element is inverted such that the movable contact is in contact with the second fixed contact.

Accordingly, in a normal operating state, the movable contact and the first fixed contact are electrically connected. When a battery heats up abnormally, the thermally responsive element is inverted and the movable contact comes into contact with the second fixed contact from the first fixed contact. Thus, switching operation of the conductive path from a regular route to the bypass is reliably performed. Furthermore, preferably, the movable contact is fixed to the free end of the thermally responsive element, the movable contact including a portion protruding toward the first fixed contact and a portion protruding toward the second fixed contact. Thus, it is not necessary to provide additional movable contacts respectively for the first and second fixed contacts.

BRIEF DESCRIPTION OF THE DRAWINGS

Referring to the drawings for the purpose of illustration only and not limitation there is illustrated.

DESCRIPTION OF THE PREFERRED EMBODIMENTS

Figure 1:
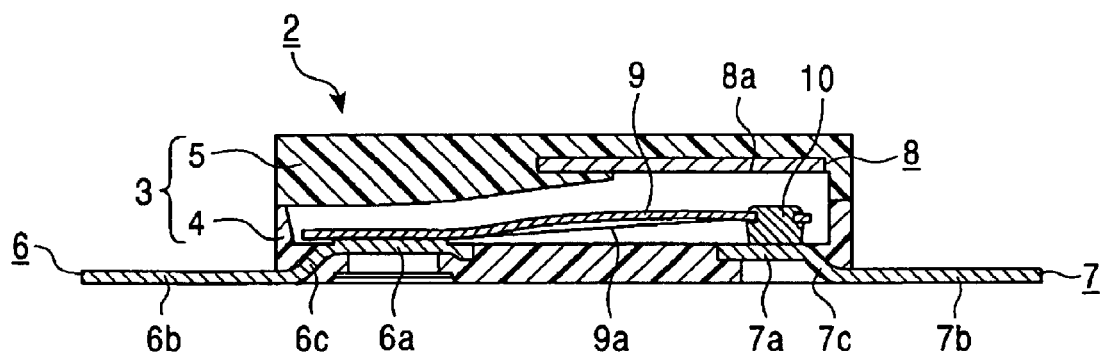
FIG. 1 is a cross-sectional view of a thermally responsive switch of a first embodiment in a normal operating state.
Figure 5:
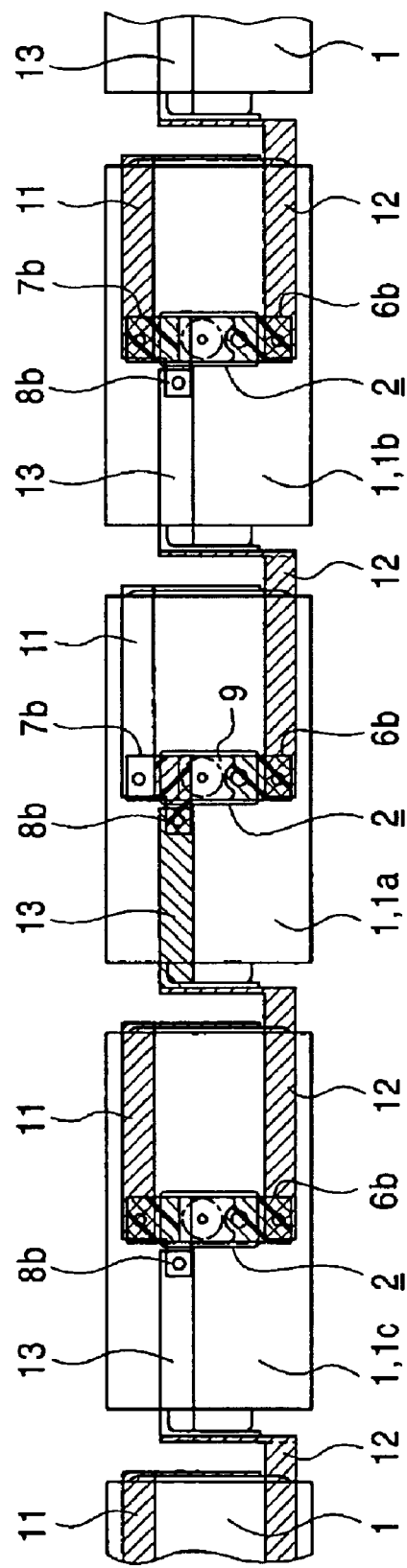
FIG. 5 is a schematic view of a main part of a battery device including the thermally responsive switches shown in FIGS. 1 to 4.

Referring to FIGS. 1 and 5, a battery device of a first embodiment according to the present invention will now be described. The battery device is composed of a plurality of batteries 1 connected in series. Each battery 1 includes a thermally responsive switch 2 and conductive plates 11, 12 and 13. The thermally responsive switch 2 includes a synthetic-resin housing 3 composed of a bottom case 4 and a top case 5, highly conductive metal plates 6 and 7 formed integrally with the bottom case 4, a highly conductive metal plate 8 formed integrally with the top case 5, a bimetal strip 9 composed of two laminated metal plates having different thermal expansion coefficients, and a highly conductive movable contact 10 fixed to a free end of the bimetal strip 9 by caulking. The bimetal strip 9 may be replaced with a trimetal strip including a highly conductive copper inner plate. The metal plates 6 to 8 are composed of brass or phosphor bronze while the movable contact 10 is composed of an alloy of copper and nickel or silver-tin oxide, for example. The bimetal strip 9 has a dome-shaped component 9a in its midsection. This dome-shaped component 9a facilitates inversion of the bimetal strip 9.

The metal plate 6 is composed of a common contact 6a which is exposed at the top surface of the bottom case 4, a common terminal 6b which protrudes outward from the bottom case 4, and a slanted section 6c which is buried in the bottom case 4. Similarly, the metal plate 7 is composed of a first fixed contact 7a which is exposed at the top surface of the bottom case 4, a first terminal 7b which protrudes outward from the bottom case 4, and a slanted section 7c which is buried in the bottom case 4. The metal plate 8 is composed of a second fixed contact 8a which is exposed at the bottom surface of the top case 5, a second terminal 8b which protrudes outward from the top case 5, and a slanted section (not shown) which is buried in the top case 5. The bimetal strip 9 has a fixed end and a free end. The fixed end is fixed to the common contact 6a by, e.g., spot welding, whereas the free end can change its position; that is, it can move between the first fixed contact 7a and the second fixed contact 8a which oppose each other. In the movable contact 10, the top portion can be in contact with the first fixed contact 7a and the bottom portion can be in contact with the second fixed contact 8a.

Figure 3:
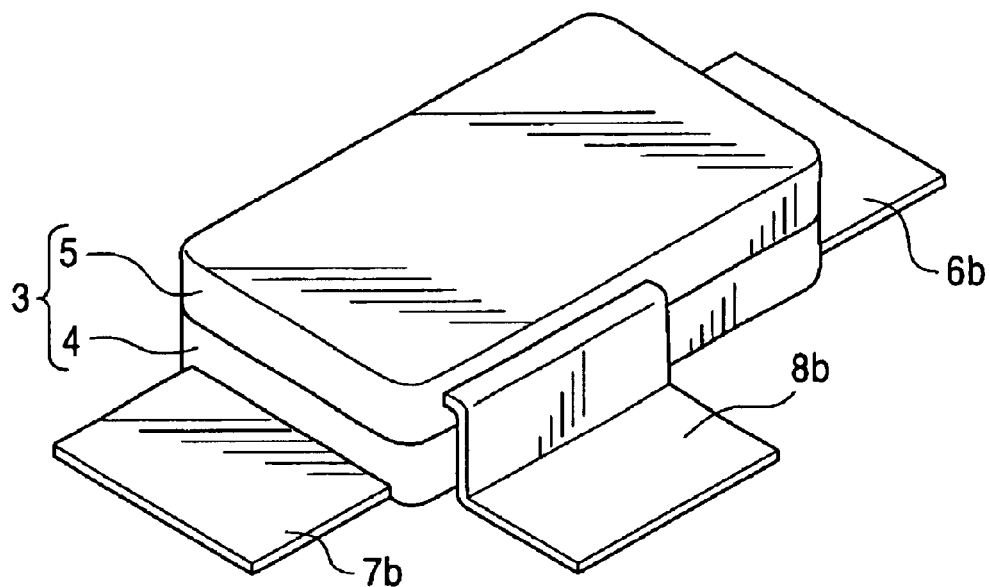
FIG. 3 is an external view of the thermally responsive switch shown in FIGS. 1 and 2.
Figure 4:
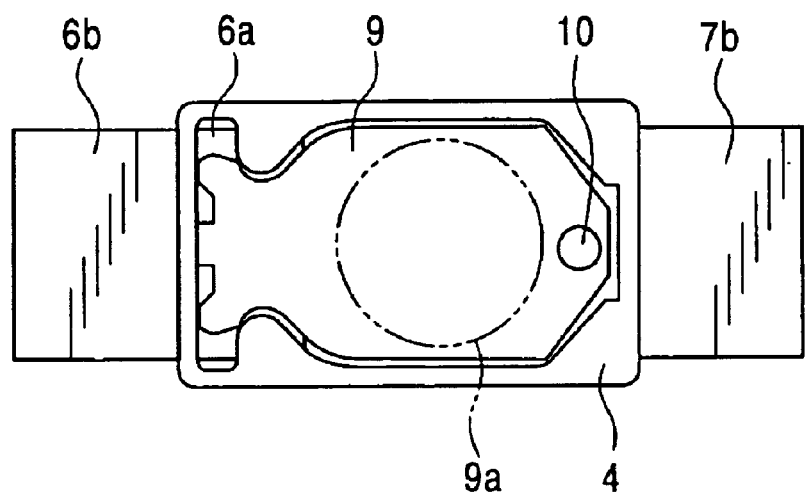
FIG. 4 is a plan view of the thermally responsive switch shown in FIGS. 1 to 3 when the top case is removed.

Turning now to FIG. 3, the common terminal 6b and the first terminal 7b protrude from the bottom case 4 of the housing 3 in opposite directions, and the second terminal 8b protrudes from the top case 5 of the housing 3 in a crossing direction (orthogonal direction in the first embodiment) with respect to the direction along which the common terminal 6b and the first terminal 7b protrude. That is, the common terminal 6b, the first terminal 7b, and the second terminal 8b protrude from the housing 3 in different directions, thereby facilitating connection of the conductive plates 11 to 13 to the terminals. Moreover, the thermally responsive switch 2 requires only a small area when it is mounted on a substrate (not shown) or an element which could heat up, such as a battery.

The common terminal 6b, which is conductively connected to the fixed end of the bimetal strip 9, protrudes from the housing 3 in the opposite direction from any one of the directions along which the first terminal 7b and the second terminal 8b protrude (the first terminal 7b in the first embodiment). Thus, the common terminal 6b and the first terminal 7b are integrally formed with the bottom case 4 by insert molding with the same metal material, resulting in excellent productivity.

Since the second terminal 8b is bent as shown in FIG. 3, the bottom faces of the common terminal 6b, the first terminal 7b, and the second terminal 8b are in the same plane. Thus, the thermally responsive switch 2 may be mounted on the surface of a substrate or the like.

For the sake of clarification, in FIG. 5 the battery 1 in the middle is denoted by the reference numeral 1a, the battery 1 on the right is denoted by the reference numeral 1b and the battery 1 on the left is denoted by the reference numeral 1c in the following description occasionally. In each of the batteries 1a to 1c, the first terminal 7b, the common terminal 6b, and the second terminal 8b of the thermally responsive switch 2 are connected to the conductive plate 11, the conductive plate 12, and the conductive plate 13, respectively. In the battery 1a, the conductive plate 11 is connected to a cathode of the battery 1a, the conductive plate 12 is connected to an anode of the battery 1b, and the conductive plate 13 is connected to a conductive plate 12 of the battery 1c.

Figure 2:
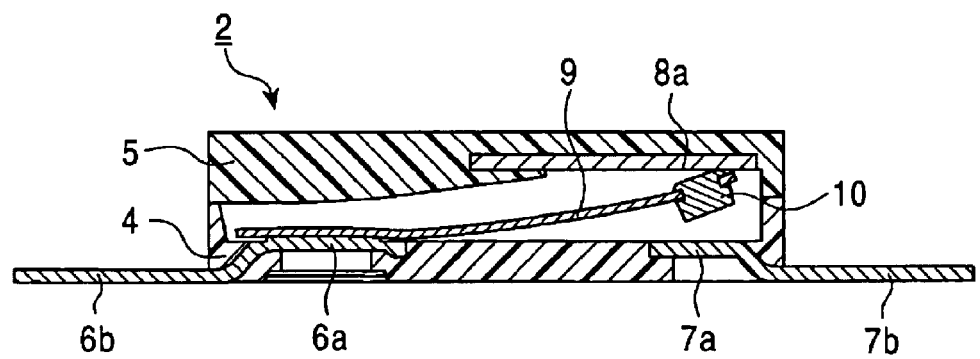
FIG. 2 is a cross-sectional view of a bimetal strip shown in FIG. 1 when it is inverted.

When the bimetal strip 9 is in a normal operating state, that is, below a predetermined temperature, the movable contact 10 is in contact with the first fixed contact 7a, as shown in FIG. 1. So the common terminal 6b and the first terminal 7b are electrically connected via the bimetal strip 9, and the conductive plates 12 and 11 are closed while the conductive plates 12 and 13 are open. When the temperature of the bimetal strip 9 exceeds the predetermined temperature, the bimetal strip 9 is inverted such that the movable contact 10 comes into contact with the second fixed contact 8a from the first fixed contact 7a as shown in FIG. 2. That is, the supply of electricity is interrupted between the common terminal 6b and the first terminal 7b, and the common terminal 6b and the second terminal 8b become electrically connected via the bimetal strip 9. Thus, the conductive plates 12 and 11 are open while the conductive plates 12 and 13 are closed.

With the battery device of the first embodiment, the thermally responsive switch 2, which is attached to each battery 1, operates as described above. Thus, if one of the batteries 1 heats up abnormally, the flow of electricity into the battery 1 will be interrupted and the conductive plate 13 attached to the battery 1 will function as a bypass. More specifically, referring to FIG. 5, when the batteries 1a to 1c operate properly, electricity flows into the cathode of each battery via the conductive plates 12 and 11 and flows out of the anode of each battery into the conductive plate 12 of the adjacent battery. If the battery 1a heats up abnormally, the bimetal strip 9 of the thermally responsive switch 2 is inverted such that the movable contact 10 comes into contact with the second fixed contact 8a from the first fixed contact 7a. So now the conductive plates 12 and 11 are open and the conductive plates 12 and 13 are closed, whereby the path shown by hatching in FIG. 5 becomes a conductive path. Accordingly, in the battery 1a, electricity from the anode of the battery 1b flows through the conductive plate 12 into the conductive plate 13, not into the conductive plate 11. Thus, in the battery 1a, electricity does not flow into the cathode and thus is interrupted. Also, electricity flows into the conductive plate 12 of the battery 1c through the conductive plates 12 and 13 of the battery 1a around the battery 1a; that is, electricity flows from the battery 1b directly to the battery 1c.

Thus, with the battery device of the first embodiment, even if one of the batteries 1 heats up abnormally, a bypass is created around the overheating battery 1 and thus the battery device continues to supply electricity. Thus, the battery device offers greatly improved operability while ensuring safety. Additionally, when the conductive plate 13 is connected to an external circuit such as a protection circuit, abnormal heating of the battery 1 is automatically reported, i.e., outputted, to the external circuit, thereby providing improved safety.

Furthermore, in the first embodiment, the thermally responsive switch 2 includes the bimetal strip 9 having a free end on which the movable contact 10 is provided and a fixed end which is always electrically connected with the common terminal 6b. Accordingly, though the thermally responsive switch 2 is constructed simply, in response to the temperature change, the movable contact 10 changes its position to be in contact with the first fixed contact 7a or the second fixed contact 8a such that switching of the conductive path in accordance with the positional change of the movable contact 10 is reliably performed. Furthermore, the first fixed contact 7a and the second fixed contact 8a oppose each other and the movable contact 10 fixed to the bimetal strip 9 can be in contact with the first fixed contact 7a or the second fixed contact 8a, whereby an additional movable contact specifically for the second fixed contact 8a for the bypass is not necessary. Hence, improved operability and safety in the battery device is achieved at a moderate cost.

Incidentally, when the first fixed contact 7a and the second fixed contact 8a oppose each other but are misaligned, in order to ensure on/off operation, two movable contacts may be separately provided so as to correspond to the first fixed contact 7a and the second fixed contact 8a, respectively. In the first embodiment, the common contact 6a, the first fixed contact 7a, and the second fixed contact 8a are integrally formed with the common terminal 6b, the first terminal 7b, and the second terminal 8b out of the metal plates 6 to 8, respectively. However, the common contact 6a, the first fixed contact 7a, and the second fixed contact 8a may be formed separately from the common terminal 6b, the first terminal 7b, and the second terminal 8b, and the contacts 6a, 7a, and 8a may be stuck to the metal plates 6 to 8, respectively, if necessary.

Figure 6:
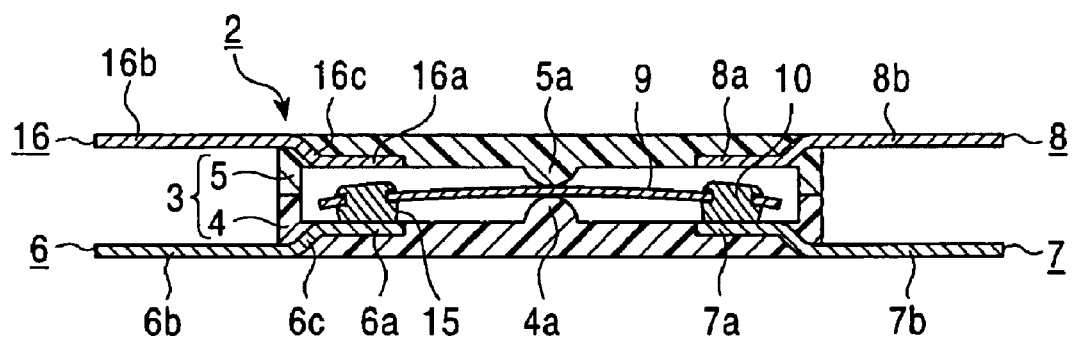
FIG. 6 is a cross-sectional view of a thermally responsive switch of a second embodiment in a normal operating state.
Figure 7:
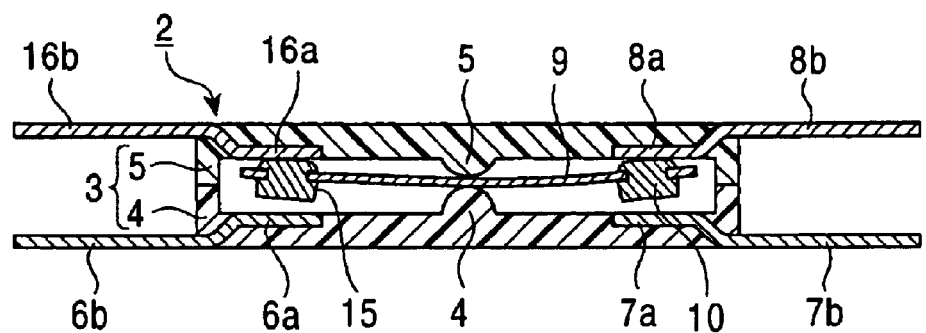
FIG. 7 is a cross-sectional view of a bimetal strip shown in FIG. 6 when it is inverted.

Referring to FIGS. 6 to 7, a second embodiment of the present invention will now be described. The same components as in FIGS. 1 and 2 are denoted by the same reference numerals.

In the thermally responsive switch 2 shown in FIGS. 6 and 7, the midsection of the bimetal strip 9 is held by a protrusion 4a of the bottom case 4 and a protrusion 5a of the top case 5. Both ends of the bimetal strip 9 can move, i.e., change their positions, and the movable contact 10 and a movable contact 15 are fixed to both ends, respectively, by caulking. A highly conductive metal plate 16, which is always electrically connected with the metal plate 6, is integrally formed with the top case 5. The metal plate 16 includes a common contact 16a which is exposed at the bottom surface of the top case 5, a common terminal 16b which protrudes outward from the top case 5, and a slanted section 16c which is buried in the top case 5. The movable contact 15 can be in contact with the common contact 16a or the common contact 6a. Although not shown, the common terminal 16b is connected to the common terminal 6b.

When the bimetal strip 9 is in a normal operating state, that is, below a predetermined temperature, the movable contacts 10 and 15 are in contact with the first fixed contact 7a and the common contact 6a, respectively, as shown in FIG. 6. So the common terminal 6b and the first terminal 7b are electrically connected via the bimetal strip 9. When the temperature of the bimetal strip 9 exceeds the predetermined temperature, the bimetal strip 9 is inverted such that the movable contact 10 comes into contact with the second fixed contact 8a from the first fixed contact 7a, and the movable contact 15 comes into contact with the common contact 16a from the common contact 6a, as shown in FIG. 7. The common contacts 6a and 16a are always electrically connected through the common terminals 6b and 16b, respectively. Therefore, whether the movable contact 15 is into contact with the common contact 6a or the common contact 16a, they are electrically equal. Thus, bringing the movable contact 10 from the first fixed contact 7a to contact the second fixed contact 8a enables a switching operation as in the first embodiment.

Additionally, the battery devices in accordance with the first and second embodiments may be constructed such that the bimetal strip 9 does not return to the normal operating state even after the temperature of the defective battery falls below the predetermined temperature. In this way, the defective battery continues serving as a bypass, offering greatly improved safety.

What is claimed is:

1. A battery device comprising a plurality of batteries connected in series, each of the plurality of batteries comprising:
   a bypass for functioning as a conductive path so that electricity detours around the battery; and
   a switch for interrupting the flow of electricity into the battery above a maximum permissible temperature, and causing the electricity to flow through the bypass,
   wherein the switch includes
      a first fixed contact connected to each of the plurality of batteries;
      a second fixed contact connected to the bypass;
      a thermally responsive element which is composed of a laminate of a plurality of metal elates having different thermal expansion coefficients, and has a free end that shifts between the first fixed contact and the second fixed contact; and
      a movable contact which is provided at the free end of the thermally responsive element and is in contact with either the first fixed contact or the second fixed contact, and
   wherein below the maximum permissible temperature, the movable contact is in contact with the first fixed contact, and above the maximum permissible temperature, the thermally responsive element is inverted such that the movable contact is in contact with the second fixed contact.

2. A battery device according to claim 1, wherein the movable contact is fixed to the free end of the thermally responsive element and includes a portion protruding toward the first fixed contact and a portion protruding toward the second fixed contact.

3. A battery device comprising a plurality of batteries connected in series, each of the plurality of batteries comprising:
   a bypass for functioning as a conductive path so that electricity detours around the battery; and
   a switch for interrupting the flow of electricity into the battery above a maximum permissible temperature, and causing the electricity to flow through the bypass,
   wherein the bypass of each battery is connected to the switch of an adjacent battery,
   wherein the switch includes a first fixed contact connected to each of the plurality of batteries;

a second fixed contact connected to the bypass;

a thermally responsive element which is composed of a laminate of a plurality of metal plates having different thermal expansion coefficients, and has a free end that shifts between the first fixed contact and the second fixed contact; and a movable contact which is provided at the free end of the thermally responsive element and is in contact with either the first fixed contact or the second fixed contact, and wherein below the maximum permissible temperature, the movable contact is in contact with the first fixed contact, and above the maximum permissible temperature, the thermally responsive element is inverted such that the movable contact is in contact with the second fixed contact.

4. A battery device according to claim 3, wherein the movable contact is fixed to the free end of the thermally responsive element and includes a portion protruding toward the first fixed contact and a portion protruding toward the second fixed contact.

5. A battery device comprising a plurality of batteries connected in series, each of the plurality of batteries comprising:

a bypass for functioning as a conductive path so that electricity detours around the battery; and a switch for interrupting the flow of electricity into the battery above a maximum permissible temperature, and causing the electricity to flow through the bypass, wherein the bypass is connected to an external circuit, wherein the switch includes a first fixed contact connected to each of the plurality of batteries;

a second fixed contact connected to the bypass;

a thermally responsive element which is composed of a laminate of a plurality of metal plates having different thermal expansion coefficients, and has a free end that shifts between the first fixed contact and the second fixed contact; and a movable contact which is provided at the free end of the thermally responsive element and is in contact with either the first fixed contact or the second fixed contact, and wherein below the maximum permissible temperature, the movable contact is in contact with the first fixed contact, and above the maximum permissible temperature, the thermally responsive element is inverted such that the movable contact is in contact with the second fixed contact.

6. A battery device according to claim 5, wherein the movable contact is fixed to the free end of the thermally responsive element and includes a portion protruding toward the first fixed contact and a portion protruding toward the second fixed contact.

* * * * *